(12) United States Patent
Martin et al.

(10) Patent No.: US 12,177,416 B1
(45) Date of Patent: Dec. 24, 2024

(54) METHODS, APPARATUSES, AND COMPUTER PROGRAM PRODUCTS FOR COMPENSATING WINDOW TO CORRECT ALIGNMENT ERROR OR USER-SPECIFIC EFFECTS

(71) Applicant: META PLATFORMS, INC., Menlo Park, CA (US)

(72) Inventors: Chadwick Brian Martin, Tucson, AZ (US); Robert Reichert, Camas, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 206 days.

(21) Appl. No.: 17/899,440

(22) Filed: Aug. 30, 2022

Related U.S. Application Data

(60) Provisional application No. 63/330,400, filed on Apr. 13, 2022.

(51) Int. Cl.
| | | |
|---|---|---|
| *H04N 17/00* | (2006.01) | |
| *G02B 27/01* | (2006.01) | |
| *G06F 3/01* | (2006.01) | |
| *H04N 23/56* | (2023.01) | |
| *H04N 23/60* | (2023.01) | |
| *H04N 25/615* | (2023.01) | |

(52) U.S. Cl.
CPC ....... *H04N 17/002* (2013.01); *G02B 27/0172* (2013.01); *G02B 27/0179* (2013.01); *G06F 3/013* (2013.01); *H04N 23/56* (2023.01); *H04N 23/64* (2023.01); *H04N 25/615* (2023.01); *G02B 2027/0138* (2013.01); *G02B 2027/014* (2013.01); *G02B 2027/0178* (2013.01); *G02B 2027/0187* (2013.01)

(58) Field of Classification Search
CPC ...... H04N 17/002; H04N 23/56; H04N 23/64; H04N 25/615; G02B 27/0172; G02B 27/0179; G02B 2027/0138; G02B 2027/014; G02B 2027/0178; G02B 2027/0187; G06F 3/013
See application file for complete search history.

(56) References Cited

U.S. PATENT DOCUMENTS

| | | | | |
|---|---|---|---|---|
| 2007/0206237 | A1* | 9/2007 | Oguri | H04N 1/4092 358/482 |
| 2014/0022440 | A1* | 1/2014 | Kishine | H04N 23/959 348/348 |
| 2015/0207999 | A1* | 7/2015 | Han | H04N 23/80 348/240.3 |
| 2017/0237967 | A1* | 8/2017 | Ono | G02B 3/14 359/676 |

\* cited by examiner

*Primary Examiner* — Shahbaz Nazrul
(74) *Attorney, Agent, or Firm* — BakerHostetler

(57) ABSTRACT

Methods, apparatuses, and systems for using a compensating window to correct tolerance-placement effects on camera focus are provided. The system may receive a first captured image of a first test target from a surface of a target plane. The first captured image may be captured using a first lens of a camera. The system may determine a first modulation transfer function measurement for the first captured image. The system may determine that the first modulation transfer function measurement is within a threshold measurement. The system may send an alert indicative that the first lens is within the threshold measurement.

22 Claims, 9 Drawing Sheets

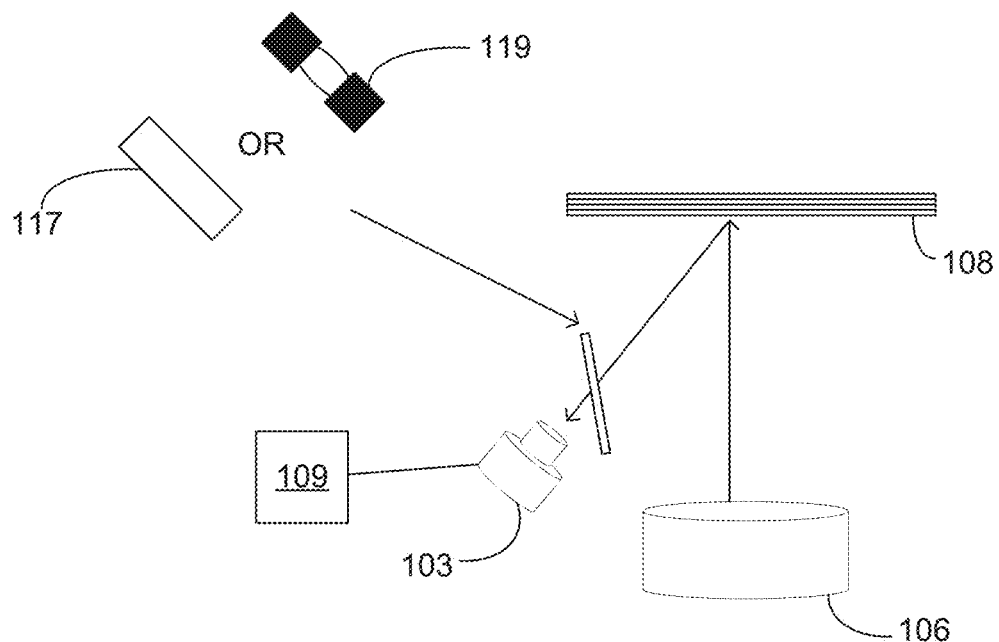
FIG. 5A
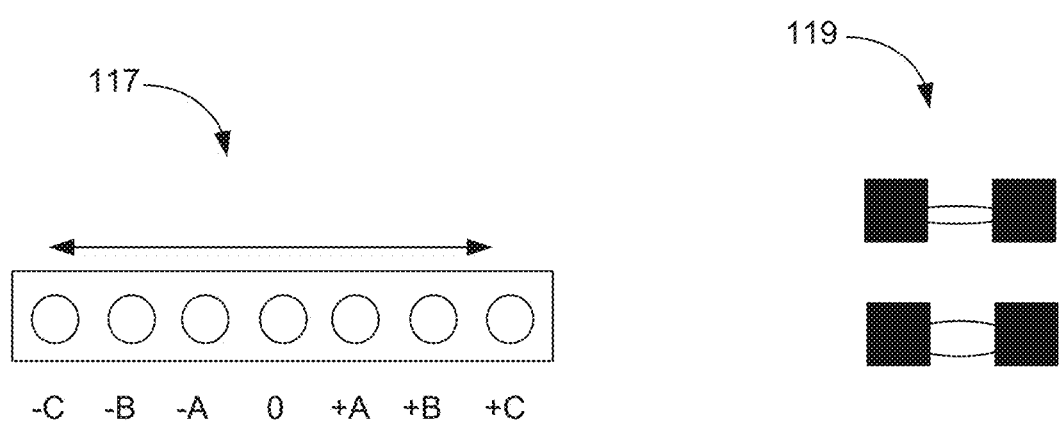
FIG. 5B
FIG. 5C

METHODS, APPARATUSES, AND COMPUTER PROGRAM PRODUCTS FOR COMPENSATING WINDOW TO CORRECT ALIGNMENT ERROR OR USER-SPECIFIC EFFECTS

CROSS-REFERENCE TO RELATED APPLICATIONS

This application claims the benefit of U.S. Provisional Application No. 63/330,400 filed Apr. 13, 2022, the entire content of which is incorporated herein by reference.

TECHNOLOGICAL FIELD

Exemplary embodiments of this disclosure relate generally to methods, apparatuses, or computer program products for a compensating window to correct tolerance-placement effects on camera focus.

BACKGROUND

Artificial reality is a form of reality that has been adjusted in some manner before presentation to a user, which may include, for example, a virtual reality, an augmented reality, a mixed reality, a hybrid reality, or some combination or derivative thereof. Artificial reality content may include completely computer-generated content or computer-generated content combined with captured (e.g., real-world) content. The artificial reality content may include video, audio, haptic feedback, or some combination thereof, any of which may be presented in a single channel or in multiple channels (such as stereo video that produces a three-dimensional (3D) effect to the viewer). Additionally, in some instances, artificial reality may also be associated with applications, products, accessories, services, or some combination thereof, that are used to, for example, create content in an artificial reality or are otherwise used in (e.g., to perform activities in) an artificial reality. Head-mounted displays (HMDs) including one or more near-eye displays may often be used to present visual content to a user for use in artificial reality applications.

BRIEF SUMMARY

Methods, apparatuses, and systems for using a compensating window to correct tolerance-placement effects on camera focus are disclosed. The compensating window may be dynamically changed to determine which of a plurality of compensating windows fall within a threshold score (e.g., measurement). The exemplary embodiments may enable the possibility of selecting the best window from multiple choices of the compensating windows to improve a modulation transfer function measurement for a captured image.

The exemplary embodiments may utilize the compensating window to correct tolerance-placement effects on camera focus or boresight error, among other things. The exemplary embodiments may include head-mounted displays that may utilize one or more compensating windows over one or more eye tracking cameras.

In an example, an apparatus is provided. The apparatus may further include one or more processors and a memory including computer program code instructions. The memory and computer program code instructions are configured to, with at least one of the processors, cause the apparatus to at least perform operations including receiving a captured image of a test target from a surface of an optical stack module. The captured image may be captured using a first lens. The memory and computer program code are also configured to, with the processor(s), cause the apparatus to determine a modulation transfer function measurement for the captured image. The memory and computer program code are also configured to, with the processor(s), cause the apparatus to determine that the modulation transfer function measurement is within a threshold measurement. The memory and computer program code are also configured to, with the processor(s), cause the apparatus to send an alert indicative that the lens is within the threshold measurement. Corresponding systems, methods and computer program products may also be provided.

In one example embodiment, a method is provided. The method may receive a first captured image of a test target on a target plane, wherein the first captured image is captured using a camera and a first lens. The method may determine a first modulation transfer function measurement for the first captured image. The method may receive a second captured image of the test target on the target plane. The second captured image may be captured using the camera and a second lens. The second lens may be different from the first lens. The method may determine a second modulation transfer function measurement for the second captured image. The method may determine that the first modulation transfer function measurement is greater than the second modulation transfer function measurement. The method may send an alert indicative of using the first lens for the camera based on the first modulation transfer function measurement being larger than the second modulation transfer function measurement.

In another example embodiment, an apparatus is provided. The apparatus may further include one or more processors and a memory including computer program code instructions. The memory and computer program code instructions are configured to, with at least one of the processors, cause the apparatus to at least perform operations including receiving a first captured image of a test target on a target plane. The first captured image may be captured using a camera and a first lens. The memory and computer program code are also configured to, with the processor(s), cause the apparatus to determine a first modulation transfer function measurement for the first captured image. The memory and computer program code are also configured to, with the processor(s), cause the apparatus to receive a second captured image of the test target on the target plane. The second captured image may be captured using the camera and a second lens. The second lens may be different from the first lens. The memory and computer program code are also configured to, with the processor(s), cause the apparatus to determine a second modulation transfer function measurement for the second captured image. The memory and computer program code are also configured to, with the processor(s), cause the apparatus to determine that the first modulation transfer function measurement is greater than the second modulation transfer function measurement. The memory and computer program code are also configured to, with the processor, cause the apparatus to send an alert indicative of using the first lens for the camera based on the first modulation transfer function measurement being larger than the second modulation transfer function measurement.

In yet another example embodiment, a computer program product is provided. The computer program product includes at least one computer-readable storage medium having computer-executable program code instructions stored therein. The computer-executable program code instructions may include program code instructions configured to receive a first captured image of a test target on a target plane. The first captured image may be captured using a camera and a first lens. The computer program product may further include program code instructions configured to determine a first modulation transfer function measurement for the first captured image. The computer-executable program code instructions may further include program code instructions configured to receive a second captured image of the test target on the target plane. The second captured image may be captured using the camera and a second lens. The second lens may be different from the first lens. The computer-executable program code instructions may further include program code instructions configured to determine a second modulation transfer function measurement for the second captured image. The computer-executable program code instructions may further include program code instructions configured to determine that the first modulation transfer function measurement is greater than the second modulation transfer function measurement. The computer-executable program code instructions may further include program code instructions configured to send an alert indicative of using the first lens for the camera based on the first modulation transfer function measurement being larger than the second modulation transfer function measurement.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

FIG. 5A illustrates an exemplary compensating window system in accordance with an exemplary embodiment.

FIG. 5B illustrates an exemplary compensating window mechanism in accordance with an exemplary embodiment.

FIG. 5C illustrates an exemplary compensating window mechanism in accordance with an exemplary embodiment.

Figure 1:
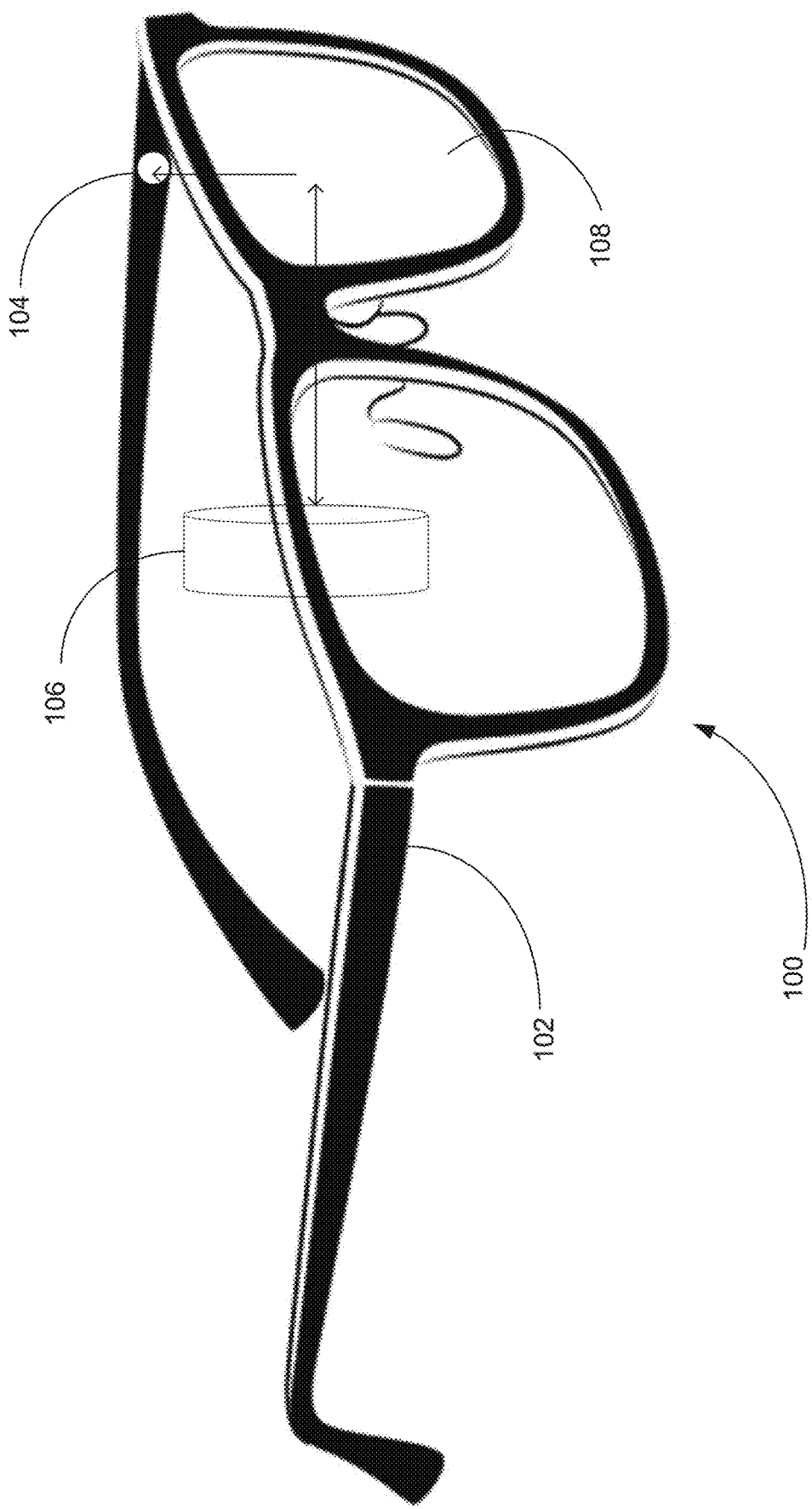
FIG. 1 illustrates an example head-mounted display (HMD) associated with artificial reality content in accordance with an exemplary embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

It is to be understood that the methods and systems described herein are not limited to specific methods, specific components, or to particular implementations. It is also to be understood that the terminology used herein is for the purpose of describing particular embodiments only and is not intended to be limiting.

HMD's including one or more near-eye displays may often be used to present visual content to a user for use in artificial reality applications. One type of near-eye display may include an enclosure that houses components of the display or is configured to rest on the face of a user, such as for example a frame. The near-eye display may include a waveguide that directs light from a projector to a location in front of the user's eyes. Because of human visual sensitivity, slight deviations in optical quality may be very apparent to the user of a near-eye display. Proper alignment of projections and enclosures with respect to each other, relative to the user, and relative to the human sensory system may be important to inhibit such deviations and to improve the user's experience viewing visual content presented by near-eye displays. The present disclosure is generally directed to systems, apparatuses, and methods for using a compensating window to correct tolerance-placement effects on camera focus. Examples in the present disclosure may include head-mounted displays that may use one or more compensating windows over one or more eye tracking cameras.

FIG. 1 illustrates an example head-mounted display (HMD) 100 associated with artificial reality content. HMD 100 may include enclosure 102 (e.g., an eyeglass frame), compensating window (CW) 104 (also may be referred to as corrective window), a test target 106, and/or optical stack module (OSM) 108. OSM 108 may include different layers, such as a Rx1 lens, holographic optical element (HOE) (also referred to as a combiner), or vertical-cavity surface-emitting laser (VCSEL), among other layers. VCSEL is just one example of illumination which may include different sources for illumination (herein referred to as on-board illumination), such as sources around the perimeter of enclosure 102, light emitting diodes (LEDs), or lasers, among other things. The Rx1 lens may be a lens associated with a user's eyeglass prescription (Rx) or modify an augmented/artificial reality (AR) display's apparent distance. For example, the AR display may present to the user an image that appears to be at infinity, but this Rx1 lens may make it appear to come from a much closer distance, such as 1 or 2 meters in front of the user. An HOE is an optical component that produces holographic images using principles of diffraction and commonly used in transparent displays. The VCSEL layer may be a semiconductor-based laser diode that emits an optical beam vertically from its top surface. As disclosed in more detail herein, within enclosure 102 there may be a camera 103 (See FIG. 2). In some example embodiments, the Rx1 lens may be a layer of the OSM 108. Furthermore, in some example embodiments, the Rx1 lens may be integral to the AR display. In some other example embodiments, the Rx1 lens may be separate from the AR display and illumination sources. In some examples, the AR display may be a metaverse display.

In conventional manufacturing or assembly processes there may be variations in where camera 103 (e.g., an eye tracking camera) is positioned. These variations, although slightly off, may degrade the ability of camera 103 to view images through OSM 108 (or in reflection/diffraction off of the OSM's combiner). If the camera is misaligned to OSM 108, the path length from camera to OSM 108 is changed, or the angle into the combiner has changed, then different power or aberrations into the path may be produced. In addition (or alternatively), OSM 108 may include a prescription (e.g., Rx1) lens (which may be very different between users) that may distort the expected image through OSM 108 that is captured by camera 103. In an example, these degradations or distortions of the captured image of camera 103 may negatively affect how an eye of a user is tracked, particularly when the degradations or distortions are outside of threshold tolerances. An approach to address this image capture issue may be to make very custom high-tolerance parts which may be expensive and hard to sort and bolt together. Other approaches may increase the size of HMD 100, which may negatively affect comfort and the aesthetic appeal of HMD 100. The disclosed subject matter provides a method, system, or apparatus for using a conventionally somewhat inert window as a compensating window (CW). CW as disclosed herein may be associated with an optical element with or without power.

Figure 2:
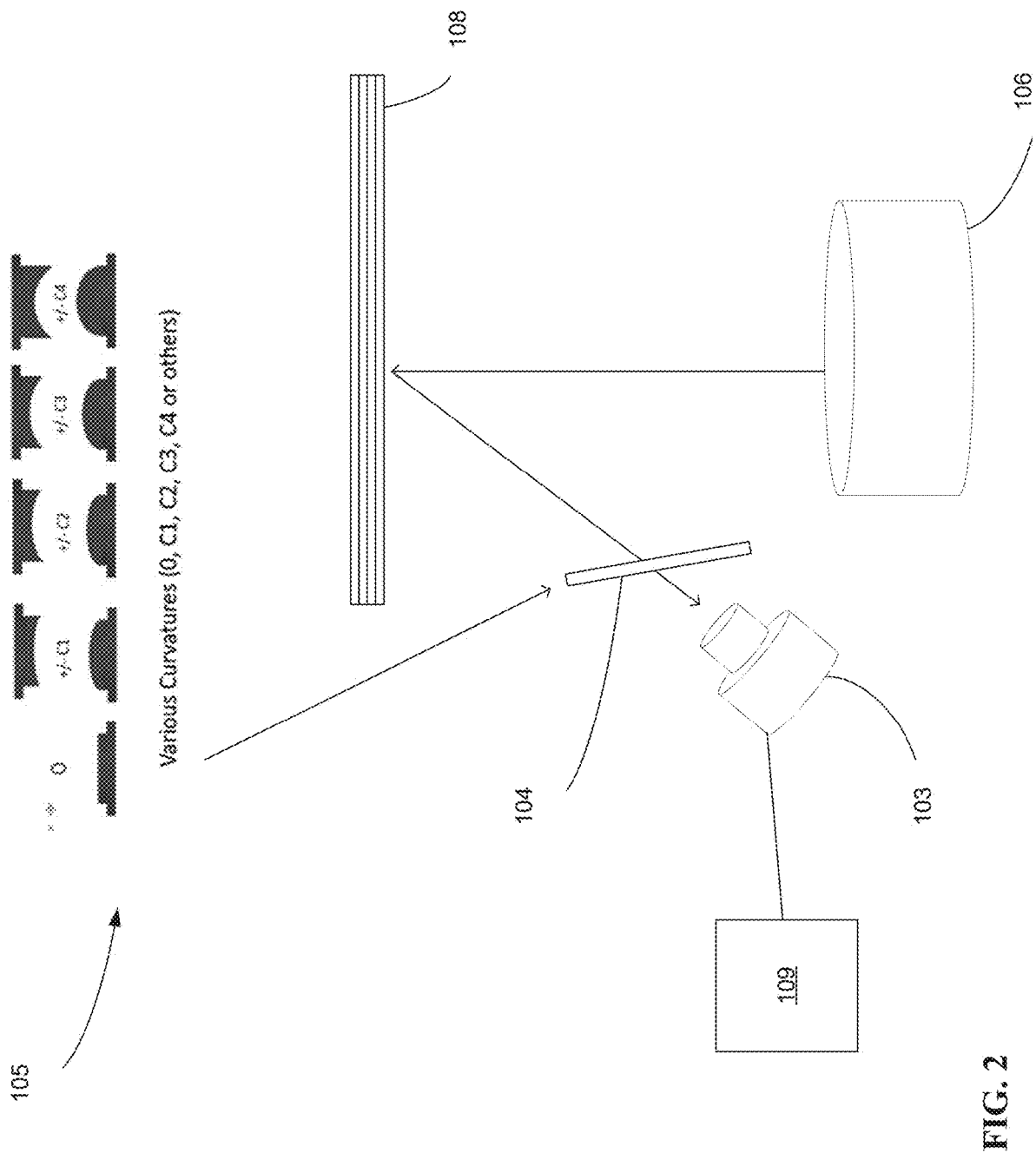
FIG. 2 illustrates an example block diagram of a compensating window system using an image projector in accordance with an exemplary embodiment.
Figure 3:
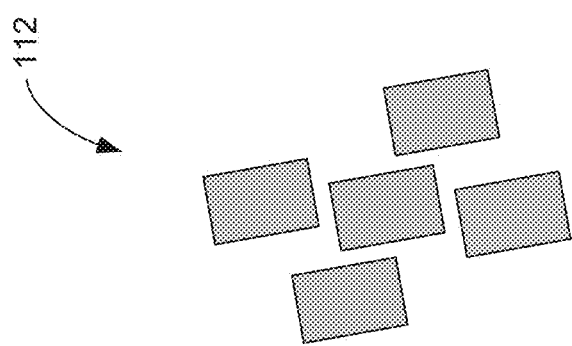
FIG. 3 illustrates an exemplary test target for analyzing compensating window in accordance with an exemplary embodiment.

FIG. 2 illustrates an example block diagram of a CW system using a test target 106. Test target 106 may be an eye of an individual, a projected custom image (e.g., test image 112 of FIG. 3) onto OSM 108 for modulation transfer function (MTF) analysis by MTF analysis processor 109, or another object. The use of an image projector would allow for MTF analysis without powering on an on-board illumination of OSM 108. MTF analysis processor 109 may be integrated into camera 103 or otherwise communicatively connected with camera 103 or other sensors to help determine one more CWs 104 (e.g., lens from list 105) that are within a threshold tolerance level or have a maximum (e.g., optimal) MTF measurement. As an alternative, the on-board illumination may illuminate the target plane rather than backlighting it as shown in FIG. 2.

Figure 4A:
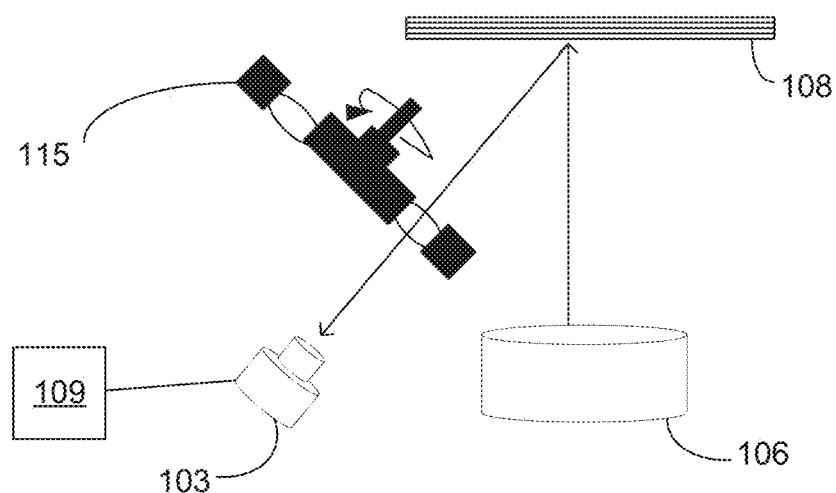
FIG. 4A illustrates an exemplary compensating window system in accordance with an exemplary embodiment.
Figure 4B:
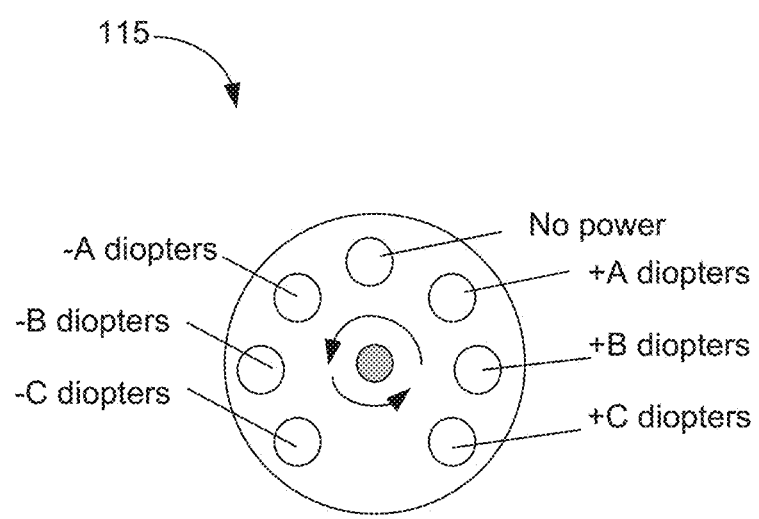
FIG. 4B illustrates an exemplary compensating window mechanism in accordance with an exemplary embodiment.

FIG. 4A-FIG. 4B illustrate an exemplary compensating window implementation. As shown in FIG. 4A and FIG. 4B, CW mechanism 115 may be a wheel with a plurality of compensating windows (e.g., CW 104) of varying power, such as positive or negative diopters. FIG. 5A, FIG. 5B and FIG. 5C illustrate exemplary compensating window implementations. As shown in FIG. 5A and FIG. 5B, CW mechanism 117 may be a slider with a plurality of compensating windows of vary power, such as positive or negative diopters. As shown in FIG. 5A and FIG. 5C, CW mechanism 119 may be a liquid (or otherwise deformable) lens with a plurality of varying powers (such as positive or negative diopters) based on how the lens is deformed. The liquid lens may have optical grade liquid injected inside of a cell structure.

Figure 6:
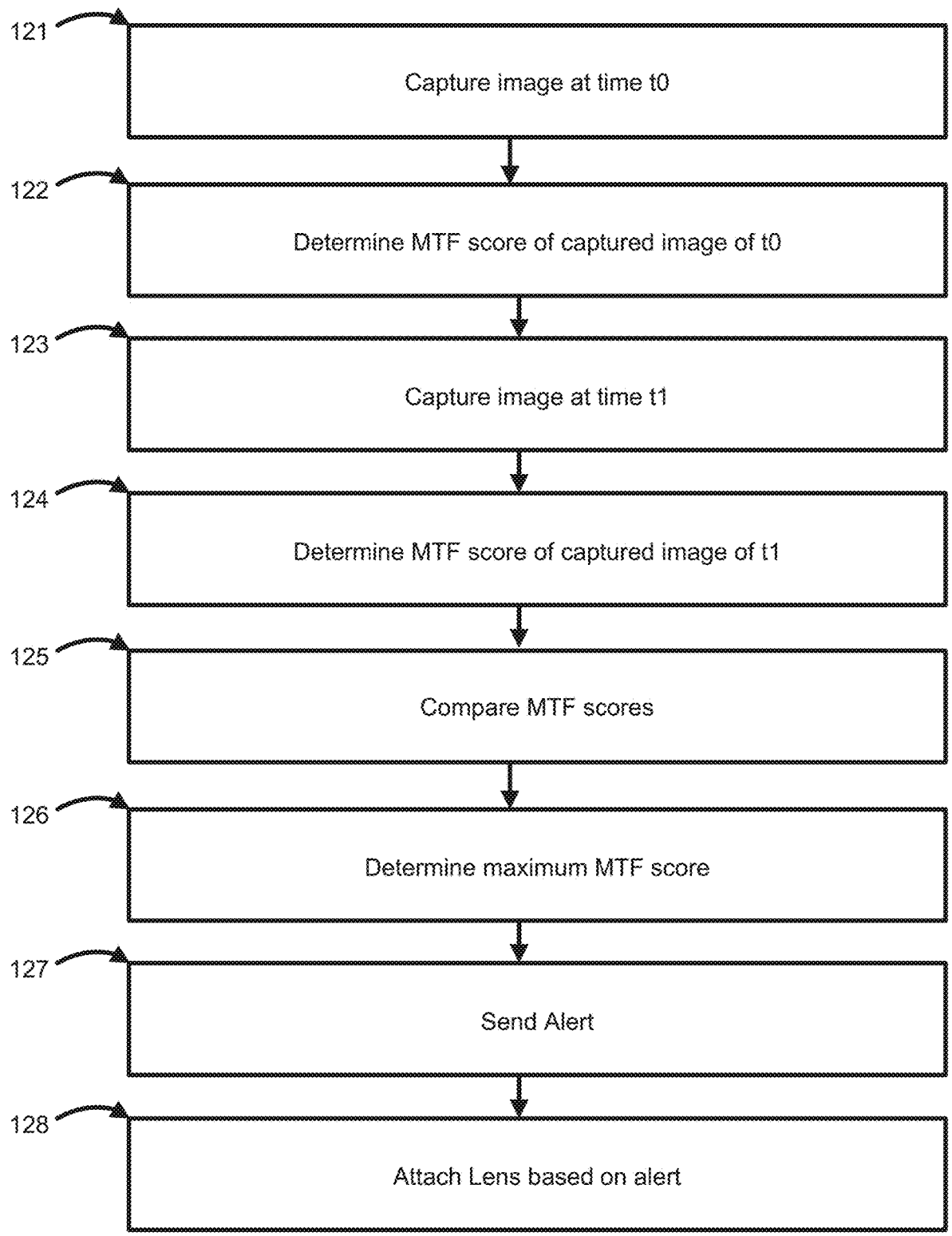
FIG. 6 illustrates an exemplary method for the compensating window system in accordance with an exemplary embodiment.

FIG. 6 illustrates an exemplary method for the CW system. At step 121, at a time to, image 112 on OSM 108 may be captured by camera 103, in which a first CW 104 may be in between camera 103 and OSM 108 (e.g., covering aperture of camera 103). The first CW 104 at t0 may be for creating a baseline level, such as having zero curvature or not present.

At step 122, based on the captured image 112 at time to, a first MTF measurement is taken by MTF analysis processor 109. It may be determined that the first MTF measurement is within a minimum threshold MTF level and therefore no additional measurement is required using other CWs 104. If no further measurement is required, then an alert may be sent indicating that the first CW 104 should be used (similar to step 127—step 128). For this scenario of reaching a minimum threshold MTF, time and expense may be reduced by not doing further analysis of other CWs 104 (e.g., lenses of list 105) if it will not be significantly beneficial to replace the lens (e.g., software may be able to address any shortfall in eye tracking based on the image). If further measurement is required, then step 123 may be performed.

At step 123, at a time t1, image 112 on OSM 108 may be captured by camera 103, in which camera 103 may be covered by a second CW 104. The second CW 104 may be selected from list 105 of a plurality of different lenses with a plurality of different curvatures, aspheric/symmetric terms, freeform/asymmetric terms, wedge, ability to address astigmatism, materials, thicknesses, ability to filter certain wavelengths (e.g., only 940 nanometer), or other different optical parameters. The curvatures of the lenses in list 105 as shown in FIG. 2 are exaggerated for effect.

At step 124, based on the captured image 112 at time t1, a second MTF measurement is determined by MTF analysis processor 109.

At step 125, comparing the first MTF measurement with the second MTF measurement.

At step 126, based on the comparing, determining which CW 104 (e.g., first CW 104 or second CW 104) has the best (e.g., highest) MTF measurement.

At step 127, send (e.g., transmit) an alert that includes the determined CW 104 with the best MTF measurement.

At step 128, based on the alert of step 127, providing instructions to attach the determined CW 104 with the best MTF measurement. The lens may be attached by using pressure sensitive adhesive, bonding, retainers, or other attachment methods. In an exemplary embodiment, a device such as for example, HMD 100 may perform the steps 121, 122, 123, 124, 125, 126, 127 and 128 of FIG. 6.

The method may be iterative and continually compare all (or some threshold number) of the available CWs 104. The method may occur during assembly of HMD 100 or any other time to test the effectiveness of the current lens, such as a periodically scheduled test (e.g., once a month) or when a layer of OSM 108 is replaced. CWs 104 may be attached to an automated lens tool (e.g., similar to a phoropter that may be found at an optometrist), in which different lenses may be rotated into position near enclosure 102 and camera 103. The desired CW 104 may also be chosen specific to a user's specific Rx prescription, IPD (interpupillary distance), or eye relief, among other things. The desired CW 104 may also be chosen specific to a distance or positioning of test target 106 in relation to camera 103 or OSM 108. For example, it may be determined from previous iterations that a camera positioned at location X may need CW 104 of a certain power when test target is (or is estimated to be) at location Y.

It is contemplated that other analysis (e.g., other than MTF measurement) may be used to score (e.g., measure) the image and make decisions on which CW 104 to recommend. Different targets other than the tilted squares of FIG. 3 may be used. Other examples of metrics are wavefront error, contrast, standard deviation, sharpness, or the like. Also, it is contemplated herein that one of the lenses of the plurality of lenses may be stacked onto another lens, such as a non-adjusted lens being placed onto an adjusted lens or multiple adjusted lens stacked onto one another. Further, it is contemplated that camera 103 be mounted somewhere around the eyeglasses frame that is pointed directly at the eye (without a combiner) from an oblique angle. CW 104 may obtain "best focus" for a given user due to differences in user IPD and eye relief as well as mounting errors in the camera angle, among other things as disclosed herein.

Although focus is disclosed herein, other issues may be addressed. For example, the compensator window may have a wedge to correct for a boresight error or cylindrical power to correct for astigmatism in a user's prescription, etc.

The test target 106 may be illuminated by a source separate from an optical stack module, such as a backlight behind a chrome on a glass target. The image of the eye (target plane) may be reflected "off of" the OSM 108. The OSM 108 may be considered a mirror. The target may be seen through (e.g., off) the mirror. The target (e.g., test target 106) may be at the eye location, while the illumination source(s) or combiner may be at the OSM 108. A window power may be determined based on the target plane location (e.g., distance) and the nearest window power available selected. There may be a system that uses targets that have features at different distances (like a stairstep or other 3D features) such that a single image may be taken and based on the depth of the features that are in "best focus" may correlate to the desired window power required. Again, the closest available window power to the determined power may be selected.

Figure 7:
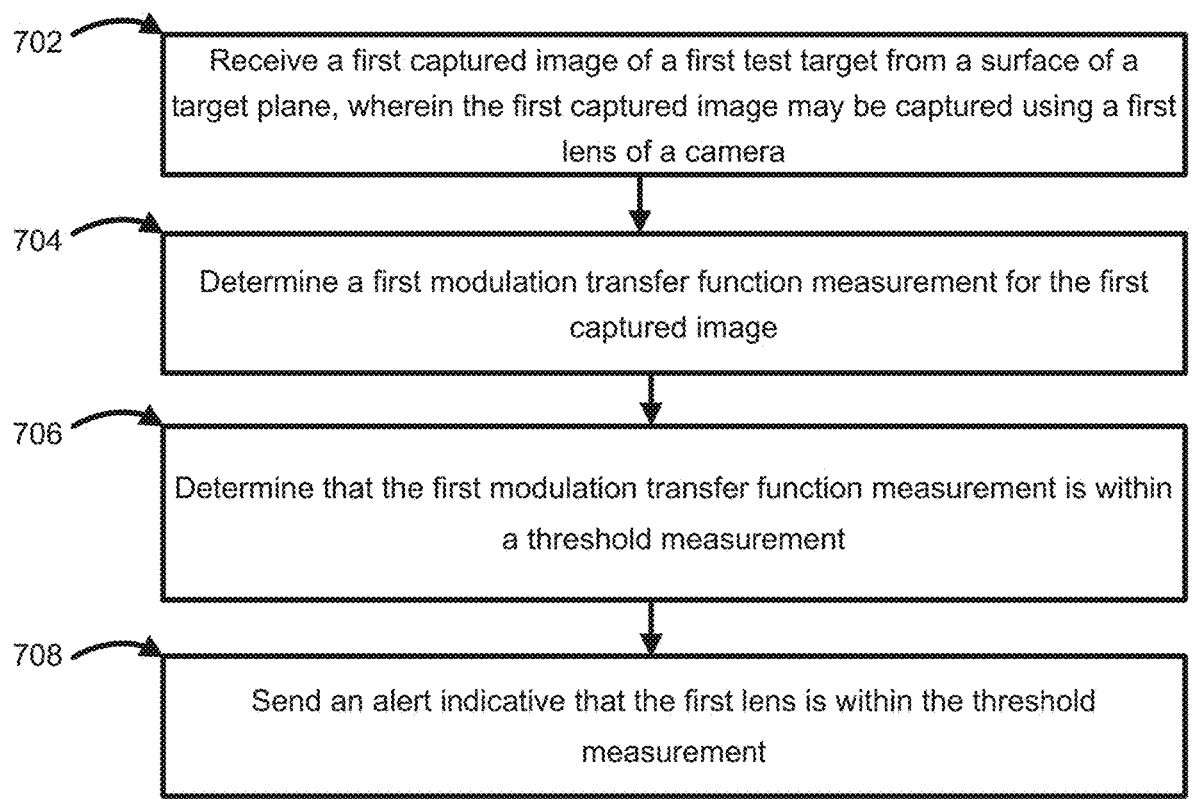
FIG. 7 illustrates another exemplary method for the compensating window system in accordance with an exemplary embodiment.

FIG. 7 illustrates another exemplary method for the CW system. At operation 702, a device (e.g., HMD 100) may receive a first captured image of a first test target from a surface of a target plane. The first captured image may be captured using a first lens of a camera (e.g., camera 103). At operation 704, a device (e.g., HMD 100) may determine a first modulation transfer function measurement for the first captured image.

At operation 706, a device (e.g., HMD 100) may determine that the first modulation transfer function measurement is within a threshold measurement (e.g., a predetermined threshold measurement). At operation 708, a device (e.g., HMD 100) may send an alert indicative that the first lens is within the threshold measurement.

Figure 8:
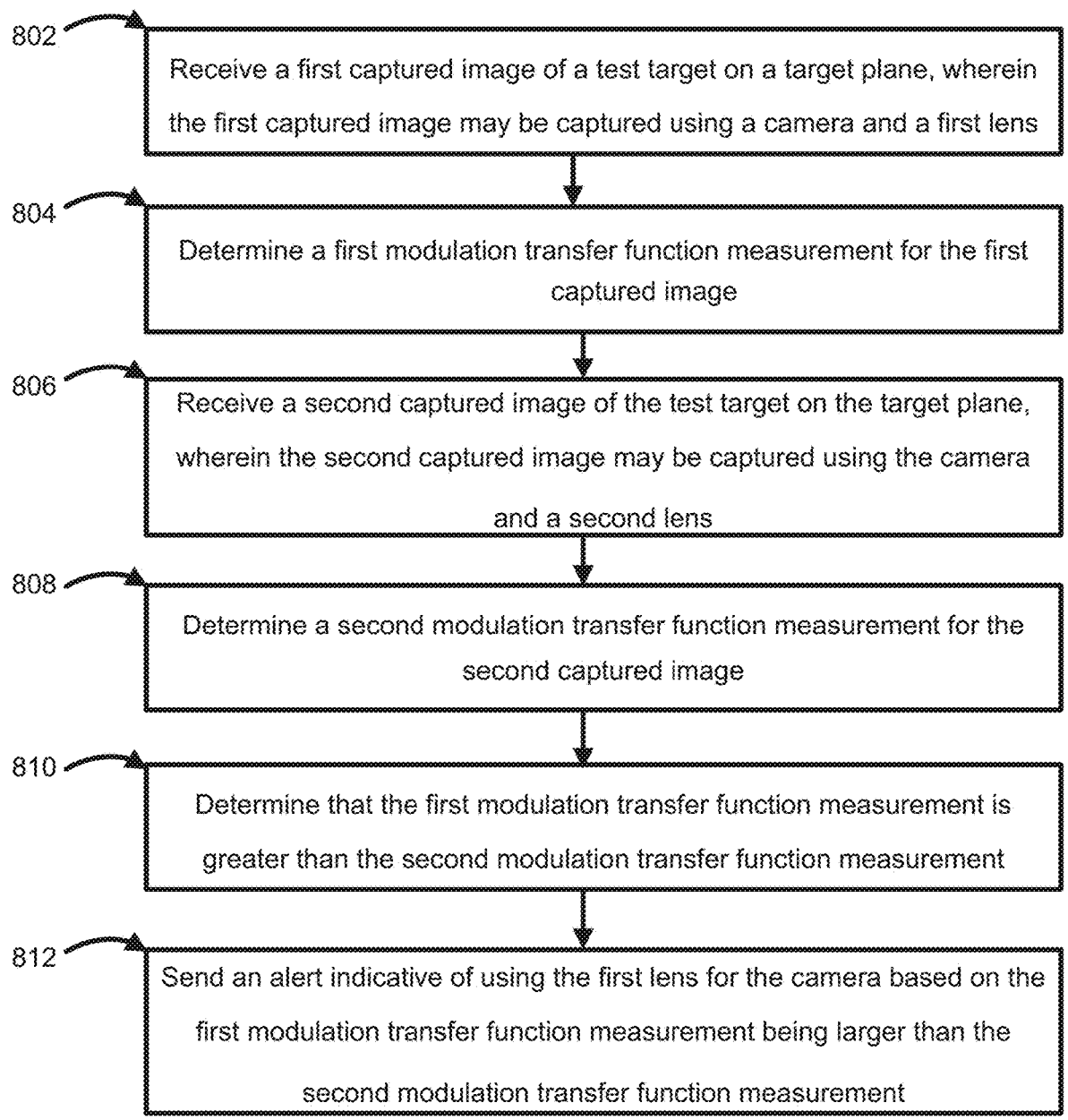
FIG. 8 illustrates yet another exemplary method for the compensating window system in accordance with an exemplary embodiment.

FIG. 8 illustrates yet another exemplary method for the CW system. At operation 802, a device (e.g., HMD 100) may receive a first captured image of a test target on a target plane. The first captured image may be captured using a camera (e.g., camera 103) and a first lens. At operation 804, a device (e.g., HMD 100) may determine a first modulation transfer function measurement for the first captured image. At operation 806, a device (e.g., HMD 100) may receive a second captured image of the test target on the target plane. The second captured image may be captured using the camera and a second lens. The second lens may be different from the first lens.

At operation 808, a device (e.g., HMD 100) may determine a second modulation transfer function measurement for the second captured image. At operation 810, a device (e.g., HMD 100) may determine that the first modulation transfer function measurement is greater than the second modulation transfer function measurement. At operation 812, a device (e.g., UMID 100) may send an alert indicative of using the first lens for the camera based on the first modulation transfer function measurement being larger than the second modulation transfer function measurement.

Figure 9:
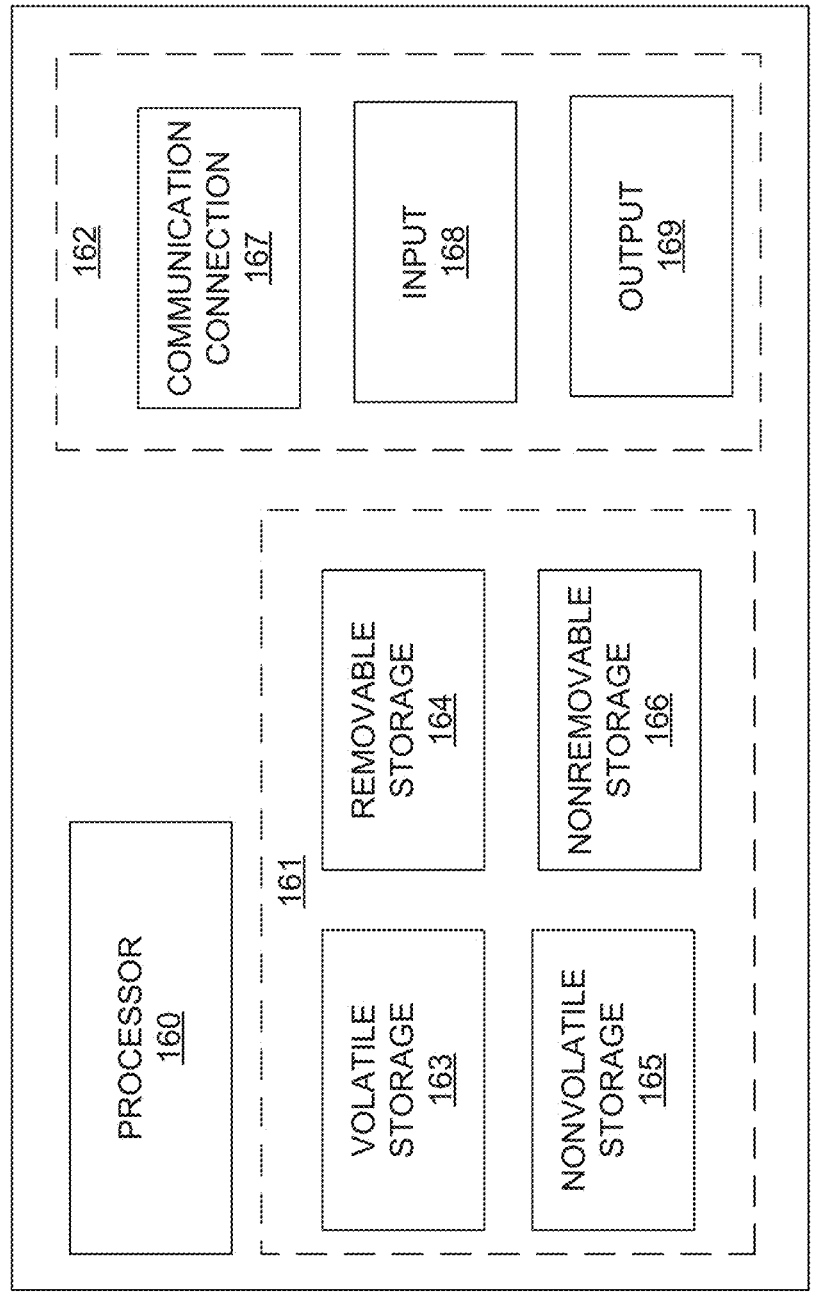
FIG. 9 is an exemplary block diagram of a device in accordance with an exemplary embodiment.

FIG. 9 is an exemplary block diagram of a device, such as, for example, HMD 100 or another device 101. In an example, HMD 100 may include hardware or a combination of hardware and software. The functionality to facilitate telecommunications via a telecommunications network may reside in one or combination of devices. A device may represent or perform functionality of one or more devices, such as a component or various components of a cellular broadcast system wireless network, a processor, a server, a gateway, a node, a gaming device, or the like, or any appropriate combination thereof. It is emphasized that the block diagram depicted in FIG. 9 is exemplary and not intended to imply a limitation to a specific implementation or configuration. Thus, HMD 100, for example, may be implemented in a single device or multiple devices (e.g., single server or multiple servers, single gateway or multiple gateways, or single controller or multiple controllers). Multiple network entities may be distributed or centrally located. Multiple network entities may communicate wirelessly, via hardwire, or any appropriate combination thereof.

HMD 100 or another device may comprise a processor 160 or a memory 161, in which the memory may be coupled with processor 160. Memory 161 may contain executable instructions that, when executed by processor 160, cause processor 160 to effectuate operations associated with the processes/methods of FIG. 6, FIG. 7 and FIG. 8, or other subject matter disclosed herein.

In addition to processor 160 and memory 161, HMD 100, or another device may include an input/output system 162. Processor 160, memory 161, or input/output system 162 may be coupled together (coupling not shown in FIG. 8) to allow communications between them. Each portion of HMD 100 or another device 101 may include circuitry for performing functions associated with each respective portion. Thus, each portion may include hardware, or a combination of hardware and software. Input/output system 162 may be capable of receiving or providing information from or to a communications device or other network entities configured for telecommunications. For example, input/output system 162 may include a wireless communication (e.g., Wi-Fi, Bluetooth, or 5G) card. Input/output system 162 may be capable of receiving or sending video information, audio information, control information, image information, data, or any combination thereof. Input/output system 162 may be capable of transferring information with HMID 100 or another device 101. In various configurations, input/output system 162 may receive or provide information via any appropriate means, such as, for example, optical means (e.g., infrared), electromagnetic means (e.g., radio frequency (RF), Wi-Fi, Bluetooth), acoustic means (e.g., speaker, microphone, ultrasonic receiver, ultrasonic transmitter), or a combination thereof. In an example configuration, input/output system 162 may comprise a Wi-Fi finder, a two-way GPS chipset or equivalent, or the like, or a combination thereof.

Input/output system 162 of HMID 100 or another device 101 also may include a communication connection 167 that allows HMD 100 or another device 101 to communicate with other devices, network entities, or the like. Communication connection 167 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, radio frequency (RF), infrared, or other wireless media. The term computer-readable media as used herein includes both storage media and communication media. Input/output system 162 also may include an input device 168 such as keyboard, mouse, pen, voice input device, or touch input device. Input/output system 162 may also include an output device 169, such as a display, speakers, or a printer.

Processor 160 may be capable of performing functions associated with telecommunications, such as functions for processing broadcast messages, as described herein. For example, processor 160 may be capable of, in conjunction with any other portion of HMD 100 or another device 101, determining a type of broadcast message and acting according to the broadcast message type or content, as described herein.

Memory 161 of HMD 100 or another device 101 may comprise a storage medium having a concrete, tangible, physical structure. As is known, a signal does not have a concrete, tangible, physical structure. Memory 161, as well as any computer-readable storage medium described herein, is not to be construed as a signal. Memory 161, as well as any computer-readable storage medium described herein, is not to be construed as a transient signal. Memory 161, as well as any computer-readable storage medium described herein, is not to be construed as a propagating signal. Memory 161, as well as any computer-readable storage medium described herein, is to be construed as an article of manufacture.

Herein, a computer-readable storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable storage medium may be volatile, non-volatile, or a combination of volatile and non-volatile, where appropriate.

The foregoing description of the embodiments has been presented for the purpose of illustration; it is not intended to be exhaustive or to limit the patent rights to the precise forms disclosed. Persons skilled in the relevant art may appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which may be executed by a computer processor for performing any or all of the steps, operations, or processes described.

Embodiments also may relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

A method, system, or apparatus may provide for a compensating window to correct alignment error or user-specific effects. The test target may be projected from a projector separate from the optical stack module. A first lens may have a larger or smaller curvature than the second lens or other differing optical parameters.

What is claimed:

1. A method comprising:
    receiving a first captured image of a test target on a target plane, wherein the first captured image is captured using a camera and a first lens;
    determining a first modulation transfer function measurement associated with the first captured image;
    receiving a second captured image of the test target on the target plane, wherein the second captured image is captured using the camera and a second lens, wherein the second lens is different from the first lens;
    determining a second modulation transfer function measurement associated with the second captured image;
    determining that the first modulation transfer function measurement is greater than the second modulation transfer function measurement;

sending an alert indicative of using the first lens associated with the camera based on the first modulation transfer function measurement being larger than the second modulation transfer function measurement; and
illuminating the test target by at least one source separate from an optical stack module.

2. The method of claim 1, further comprising:
tracking, by the camera, one or more eyes in a head-mounted display.

3. The method of claim 1, further comprising:
illuminating the test target by one or more sources integrated into the optical stack module.

4. The method of claim 1, wherein the at least one source comprises glint sources configured to perform the illuminating, wherein the glint sources are projected from one or more vertical cavity surface emitting lasers.

5. The method of claim 1, wherein the optical stack module comprises a prescription lens or a vertical cavity surface emitting laser.

6. The method of claim 1, wherein the first lens comprises a larger or a smaller curvature than the second lens.

7. The method of claim 1, wherein the first lens and the second lens comprise different optical parameters.

8. The method of claim 1, wherein the target plane comprises a surface of at least one eye.

9. A method comprising:
receiving a first captured image of a first test target from a surface of a target plane, wherein the first captured image is captured using a first lens of a camera;
determining a first modulation transfer function measurement associated with the first captured image;
determining that the first modulation transfer function measurement is within a threshold measurement;
sending an alert indicative that the first lens is within the threshold measurement; and
transmitting one or more instructions to attach the first lens to a window associated with the camera based on the alert.

10. The method of claim 9, further comprising:
attaching the first lens using pressure sensitive adhesive.

11. The method of claim 9, further comprising:
determining a window power based on a location associated with the target plane; and
selecting an available compensating window that comprises a power that is nearest the determined window power.

12. An apparatus comprising:
one or more processors; and
at least one memory coupled with the one or more processors, the at least one memory storing executable instructions that when executed by the one or more processors, cause the apparatus to:
receive a first captured image of a test target on a target plane, wherein the first captured image is captured using a camera and a first lens;
determine a first modulation transfer function measurement for the first captured image;
receive a second captured image of the test target on the target plane, wherein the second captured image is captured using the camera and a second lens, wherein the second lens is different from the first lens;
determine a second modulation transfer function measurement for the second captured image;
determine that the first modulation transfer function measurement is greater than the second modulation transfer function measurement;
send an alert indicative of using the first lens for the camera based on the first modulation transfer function measurement being larger than the second modulation transfer function measurement; and
track, by the camera, one or more eyes.

13. The apparatus of claim 12, wherein the apparatus comprises a head-mounted display.

14. The apparatus of claim 12, wherein when the one or more processors further execute the instructions, the apparatus is configured to:
illuminate the test target by at least one source separate from an optical stack module.

15. The apparatus of claim 12, wherein when the one or more processors further execute the instructions, the apparatus is configured to:
illuminate the test target by one or more sources integrated into an optical stack module.

16. The apparatus of claim 14, wherein the at least one source comprises at least one glint source configured to perform the illuminate, wherein the at least one glint source is projected from one or more vertical cavity surface emitting lasers.

17. The apparatus of claim 14, wherein the optical stack module comprises a prescription lens or a vertical cavity surface emitting laser.

18. The apparatus of claim 12, wherein the first lens comprises a larger or a smaller curvature than the second lens.

19. A non-transitory computer-readable medium storing instructions that, when executed, cause:
receiving a first captured image of a first test target from a surface of a target plane, wherein the first captured image is captured using a first lens of a camera;
determining a first modulation transfer function measurement associated with the first captured image;
determining that the first modulation transfer function measurement is within a threshold measurement;
sending an alert indicative that the first lens is within the threshold measurement; and
transmitting one or more instructions to attach the first lens to a window associated with the camera based on the alert.

20. The computer-readable medium of claim 19, further comprising instructions which when executed, cause:
determining a window power based on a location associated with the target plane; and
selecting an available compensating window that comprises a power that is nearest the determined window power.

21. The computer-readable medium of claim 19, wherein the first lens is attached with pressure sensitive adhesive.

22. The computer-readable medium of claim 19, wherein the first lens comprises a liquid.

* * * * *